United States Patent [19]

Toga

[11] Patent Number: 5,032,014
[45] Date of Patent: Jul. 16, 1991

[54] DATUM BEAM PROJECTING APPARATUS FOR USE WITH SURVEYING EQUIPMENT

[75] Inventor: Noriyuki Toga, Tokyo, Japan

[73] Assignee: Asahi Seimitu Kabushiki Kaisha, Tokyo, Japan

[21] Appl. No.: 427,366

[22] Filed: Oct. 27, 1989

[30] Foreign Application Priority Data

Oct. 27, 1988 [JP] Japan .................. 63-271361

[51] Int. Cl.$^5$ .............................. G02B 17/00
[52] U.S. Cl. .................................. 350/447
[58] Field of Search .............. 350/447, 432, 433; 369/45

[56] References Cited

U.S. PATENT DOCUMENTS 2,868,066  1/1959  Argyle ..................... 350/447

FOREIGN PATENT DOCUMENTS 0162734  11/1985  European Pat. Off. .
0223043   5/1987  European Pat. Off. .
60-200117 10/1985  Japan .
61-105811  7/1986  Japan .
63-179208  7/1988  Japan .
2200474   8/1988  United Kingdom .

Primary Examiner—Paul M. Dzierzynski

[57] ABSTRACT

A datum beam projecting apparatus for use with surveying equipment projects light rays emitted from a light source as the datum beam through a projecting lens system, wherein the apparatus uses a plane-parallel glass serving to compensate for tilt of the datum beam, thereby maintaining a direction of the projected datum beam constant with respect to a tilt of the apparatus. The plane-parallel glass is tiltably located in an optical path defined between the light source and the projecting lens system so that the following relationship may be satisfied:

$$\tan \beta = K \tan \alpha$$

where $\alpha$ represents a tilt of the apparatus, $\beta$ represents a tilt of the plane-parallel glass and K is a constant. With the apparatus, a tilt of the data beam can be effectively compensated merely by tilting the plane-parallel glass by the angle $\beta$ corresponding to a predetermined times the tilt $\alpha$ of the apparatus, so that the complicated arrangement comprising concave lenses, prisms etc. usually required for compensation can be eliminated. Thereby, not only can the structure be simplified but also reliable precision can be obtained at a reasonable cost.

9 Claims, 5 Drawing Sheets

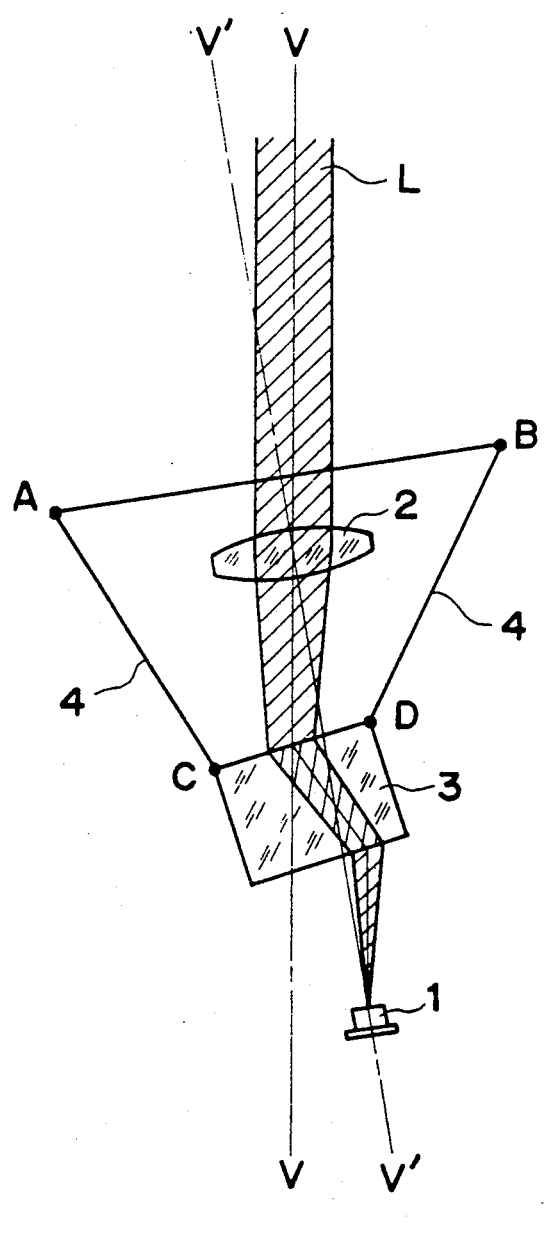
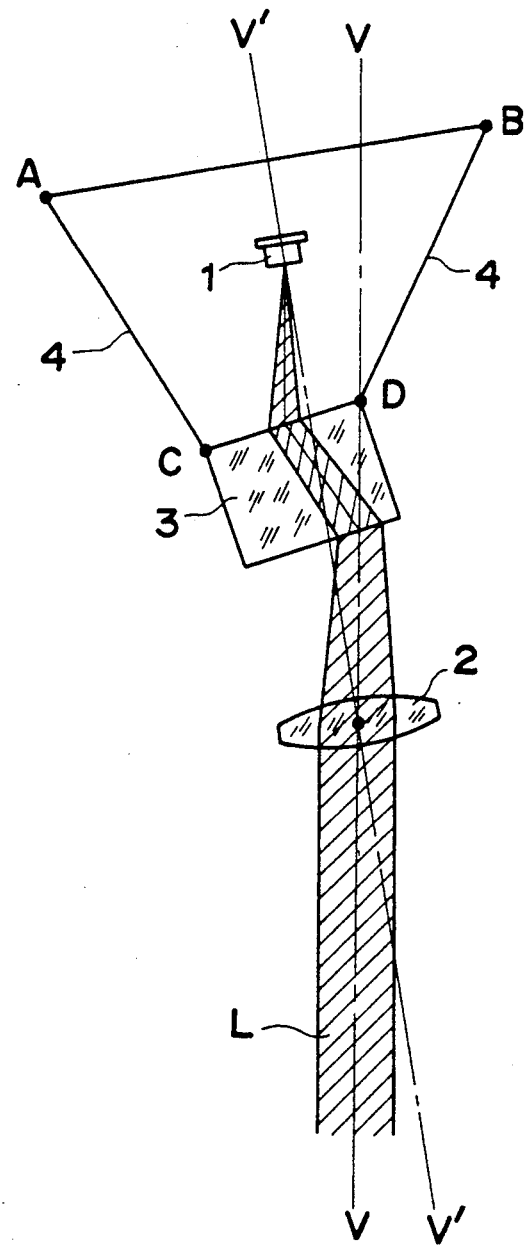

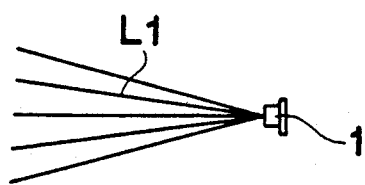
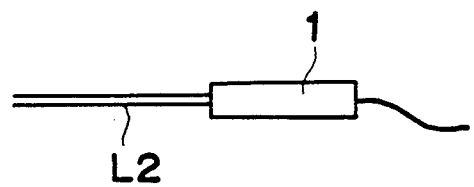
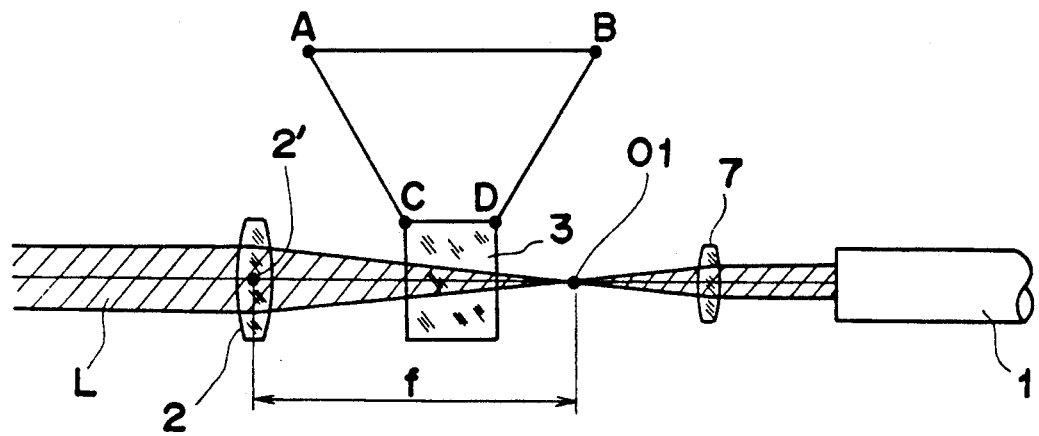
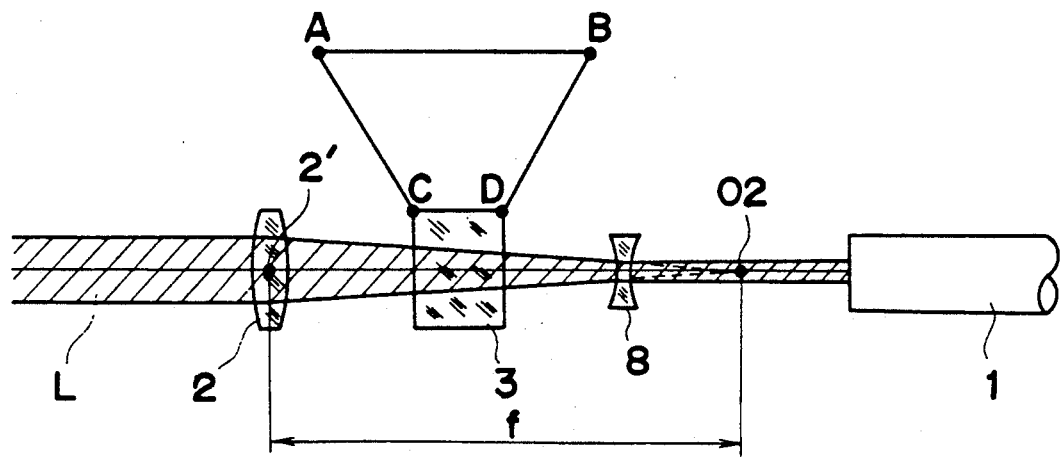

DATUM BEAM PROJECTING APPARATUS FOR USE WITH SURVEYING EQUIPMENT

BACKGROUND OF THE INVENTION

The present invention relates to a datum beam projecting apparatus for use with surveying equipment such as an optical leveling type to provide a datum level in construction surveying or the like.

Although the datum beam projecting apparatus for surveying equipment should ideally be installed on a horizontal trestle, this apparatus has usually been installed, in practice, inevitably with a slight tilt and it has been required to compensate for such a tilt of the apparatus to achieve an effective projection of the datum beam. As an example of the well known apparatuses provided with means to maintain the direction in which the datum beam is projected constant by compensating for the tilt of the apparatus, Japanese Disclosure Gazette No. 1985-200117 discloses a datum beam projecting apparatus used with surveying equipment to project light rays emitted from a light source as the datum beam through a projecting lens system. This system includes a suspended reflector member of a complicated structure, for example, an erect prism or a Porroprism. Another example is disclosed in Japanese Disclosure Gazette (of Utility Model Application) No. 1986-105811, which includes a complicated structure comprising a pair of two-face reflectors individually suspended so that respective optical paths thereof extend perpendicularly to each other. Further, another example is disclosed in Japanese Disclosure Gazette No. 1988-179208, which includes a projecting lens system comprising a convex lens fixed to the apparatus and a concave lens suspended in an intricated distance-relationship with said convex lens. However, all of such well known apparatuses are inconveniently intricate in their structures which, in turn, increase factors not only making the accuracy unreliable but also making the cost of manufacturing unacceptably high.

SUMMARY OF INVENTION

In view of the problems encountered by the prior art, the present invention basically resides in a datum beam projecting apparatus for use with surveying equipment to project light rays emitted from a light source as the datum beam through a projecting lens system. The apparatus uses a plane-parallel glass to compensate for tilt of the datum beam, thereby maintaining a direction of the projected datum beam constant with respect to a tilt of said apparatus and said plane-parallel glass is tiltably located in an optical path defined between the light source and the projecting lens system so that the following equation may be satisfied:

$$\tan \beta = K \tan \alpha$$

where $\alpha$ represents a tilt of the apparatus, $\beta$ represents a tilt of the plane-parallel glass and K is a constant.

Preferably, the plane-parallel glass is suspended with the tilt $\beta$ with respect to the tilt $\alpha$ of said apparatus.

It is preferable to locate the plane-parallel glass in the optical path defined between the light source and the projecting lens system.

It is also within a scope of the invention to locate the plane-parallel glass in the optical path including the projecting lens system.

The apparatus can be arranged so that the datum beam is horizontally projected.

The apparatus can be arranged so that the datum beam is projected vertically upward.

The apparatus can be also arranged so that the datum beam is projected vertically downward.

Preferably, a rotatable two-face reflector is provided in the optical path of the datum beam.

Preferably, the two-face reflector is rotatably driven by an electromotor.

Preferably, said rotatable two-face reflector is provided in the form of a two-face reflector unit adapted to be detachably mounted on the apparatus. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 2 is a diagram similar to FIG. 1 but illustrating another embodiment of the apparatus constructed in accordance with the present invention, which is adapted to project the datum beam in a vertically upward direction;

FIG. 3 is a diagram similar to FIG. 1 but illustrating further another embodiment of the apparatus constructed in accordance with the present invention, which is adapted to project the datum beam in a vertically downward direction;

FIGS. 8 (a) and 8 (b) are diagrams respectively illustrating embodiments of the light source used in the apparatus of this invention;

FIG. 9 is a principle diagram illustrating still another embodiment of the apparatus constructed in accordance with the present invention; and FIG. 10 is a diagram similar to FIG. 9 but illustrating further another embodiment of the apparatus constructed in accordance with the present invention.

EMBODIMENTS

Before the present invention is described with respect to its detailed construction, operation thereof will be explained with reference to FIG. 1.

Figure 1:
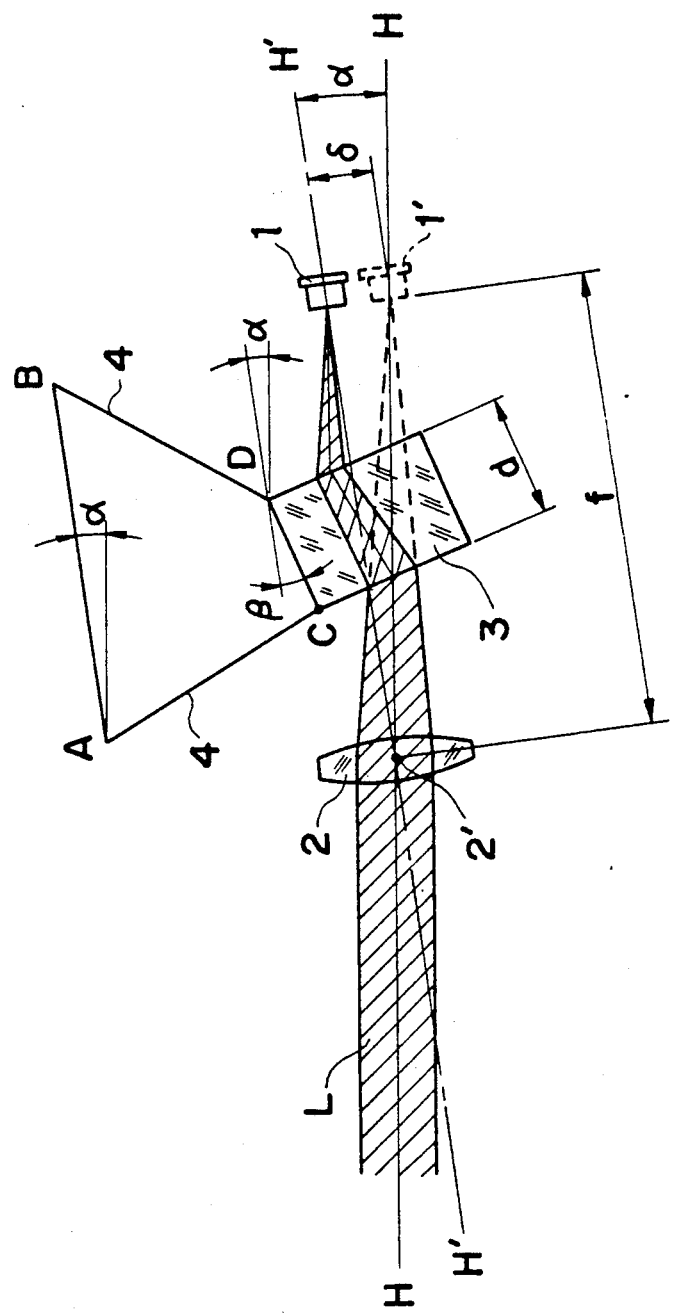
FIG. 1 is a principle diagram illustrating an embodiment of the apparatus constructed in accordance with the present invention, which is adapted to project the datum beam in a horizontal direction.

Referring to FIG. 1 which is a principle diagram illustrating an embodiment of the apparatus constructed in accordance with the present invention so as to project the datum beam in the horizontal direction, reference numeral 1 designates a light source, reference numeral 2 designates a projecting lens system of a focal distance f, and reference numeral 3 designates a plane-parallel glass suspended at points C, D by suspension wire 4 extending from fixed points A, B. With the apparatus tilting by an angle $\alpha$, an optical axis H'—H' connecting the light source 1 to the projecting lens system 2 tilts by the angle $\alpha$ with respect to a horizontal datum line H—H while the plane-parallel glass 3 tilts by an angle $\beta$ with respect to the apparatus, and a virtual image 1' of the light source 1 is translated by a distance $\delta$ just onto the horizontal datum line H—H. Reference numeral 2' designates an optical center of the projecting lens system 2 and a letter d designates a thickness of the plane-parallel glass 3. Though the projecting lens system 2 is shown and described here as comprising a single convex lens, it is obviously possible to combine a plurality of lenses to constitute the projecting lens system 2 and, in such a case also, even if there is any additional lens between the plane-parallel glass 3 and the light source 1, the virtual image 1' of the light source 1 will be translated by the distance $\delta$ under the effect of the plane-parallel glass 3, because, if said additional lens is a condensing lens, its condensing point will become a new light source 1 for said projecting lens system 2 and, if said additional lens is a diffusing lens, its diffusing datum point will become a new light source 1 for said projecting lens system 2.

Referring to FIG. 1, said distance $\delta$ between the light source 1 and its virtual image 1' is expressed, on the basis of a geometrical relationship, by a following equation (1):

$$\delta = f \tan \alpha \quad (1)$$

A translation $\delta'$ of the optical path due to the tilt $\beta$ of the plane-parallel glass 3 is expressed, on the basis of an optical relationship, by $$\delta' = \frac{n-1}{n} d \cdot \tan \beta \quad (2)$$

where n represents a refractive index of the plane-parallel glass 3.

If the direction of the projected beam is kept on the horizontal datum line H—H independently of the tilt $\alpha$ of the apparatus, $$\delta' = \delta \quad (3)$$

will be established.

By substituting the equations (1) and (2) for the equation (3), a following equation (4) is derived:

$$\tan \beta = \frac{nf}{(n-1)d} \tan \alpha \quad (4)$$

Here, n, f and d represent constants, respectively, so the equation (4) can be transformed into:

$$\frac{nf}{(n-1)d} = K \text{ (constant)} \quad (5)$$

Substitution of the equation (5) for the equation (4) gives:

$$\tan \beta = K \tan \alpha \quad (6)$$

Thus, by arrangement that the plane-parallel glass 3 tilts by the angle $\beta$ corresponding to K times the tilt $\alpha$ of the apparatus, the datum beam L can be compensated so as to maintain the direction of projected datum beam always in coincidence with the datum line.

The present invention will be described in detail, by way of example, with reference to the accompanying drawing.

Referring to FIG. 1 which is a principle diagram illustrating the embodiment of the apparatus constructed in accordance with the present invention so as to project the datum beam in a horizontal direction, as has already been described above in connection with the operation, reference numeral 1 designates a light source, reference numeral 2 designates a projecting lens system of a focal distance f, and reference numeral 3 designates a plane-parallel glass suspended at points C, D by suspension wire 4 extending from fixed points A, B. With the apparatus tilting by an angle $\alpha$, an optical axis H'—H' connecting the light source 1 to the projecting lens system 2 tilts by the angle $\alpha$ with respect to a horizontal datum line H—H while the plane-parallel glass 3 tilts by an angle $\beta$ with respect to the apparatus, and a virtual image 1' of the light source 1 is translated by a distance $\delta$ just onto the horizontal datum line H—H. Reference numeral 2' designates an optical center of the projecting lens system 2 and a letter d designates a thickness of the plane parallel glass 3.

Though the projecting lens system 2 is shown and described here as comprising a single convex lens, it is obviously possible to combine a plurality of lenses to constitute the projecting lens system 2 and, in such a case also, even if there is any additional lens between the plane-parallel glass 3 and the light source 1, the virtual image 1' of the light source 1 will be translated by the distance $\delta$ under the effect of the plane-parallel glass 3, because, if said additional lens is a condensing lens, its condensing point will become a new light source 1 for said projecting lens system 2 and, if said additional lens is a diffusing lens, its diffusing datum point will become a new light source 1 for said projecting lens system 2.

Between the tilt $\beta$ of the plane-parallel glass 3 and said tilt $\alpha$ of the apparatus, there is established a relationship as expressed by:

$$\tan \beta = K \tan \alpha \quad (6)$$

and $$\frac{nf}{(n-1)d} = K \text{ (constant)} \quad (7)$$

where n represents a refractive index of the plane-parallel glass 3. FIG. 2 is a principle diagram illustrating the embodiment of the apparatus constructed in accordance with this invention so as to project the datum beam L in a vertically upward direction, in which reference numeral 1 designates a light source, reference numeral 2 designates a projecting lens system of a focal distance f, and reference numeral 3 designates a plane-parallel glass suspended at points C, D by suspension wire 4 extending from fixed points A, B. With the apparatus tilting by an angle $\alpha$, an optical axis V'—V' connecting the light source 1 to the projecting lens system 2 tilts by the angle $\alpha$ with respect to a vertical datum line V—V while the plane-parallel glass 3 tilts by an angle $\beta$ with respect to the apparatus and, just as in the case of FIG. 1, a tilt of the vertically projected datum beam L can be effectively compensated merely by tilting the plane-parallel glass 3 by the angle $\beta$ corresponding to a predetermined times the tilt $\alpha$ of the apparatus.

FIG. 3 is a principle diagram illustrating the embodiment of the apparatus constructed in accordance with this invention so as to project the datum beam L in a vertically downward direction, in which reference numeral 1 designates a light source, reference numeral 2 designates a projecting lens system of a focal distance f, and reference numeral 3 designates a plane-parallel glass suspended at points C, D by suspension wire 4 extending from fixed points A, B. With the apparatus tilting by an angle $\alpha$, the optical axis V'—V' connecting the light source 1 to the projecting lens system 2 tilts by the angle $\alpha$ with respect to the vertical datum line V—V while the plane-parallel glass 3 tilts by the angle $\beta$ with respect to the apparatus and, just as in the case of FIG. 1, a tilt of the vertically downward projected datum beam L can be effectively compensated merely by tilting the plane-parallel glass 3 by the angle $\beta$ corresponding to a predetermined times the tilt $\alpha$ of the apparatus.

Figure 4:
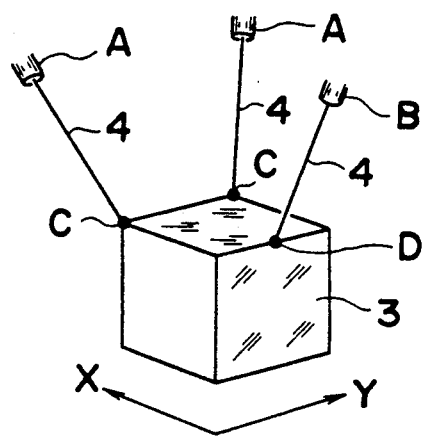
FIG. 4 is a perspective view schematically illustrating an embodiment of the essential part constituting the apparatus of this invention.
Figure 5:
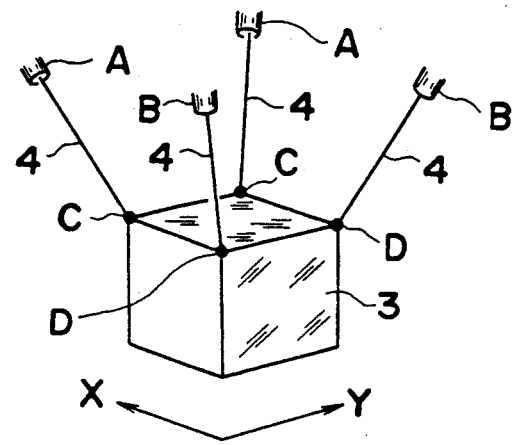
FIG. 5 is a view similar to FIG. 4 but illustrating another embodiment of the essential part constituting the apparatus of this invention.

FIGS. 4 and 5 respectively illustrate suspending means for the plane-parallel glass 3, FIG. 4 illustrating the case of three-wire suspension and FIG. 5 illustrating the case of four-wire suspension. In both cases, the plane-parallel glass can be tilted both in the directions of X and Y.

It should be understood that, in the embodiments of FIGS. 4 and 5, the suspension wire 4 may be replaced by the tape-like suspending means limiting the direction in which the plane-parallel glass 3 can be tilted to only one direction X or Y, as described in Japanese Disclosure Gazette (of Utility Model Application) No. 1986-105811.

Figure 6:
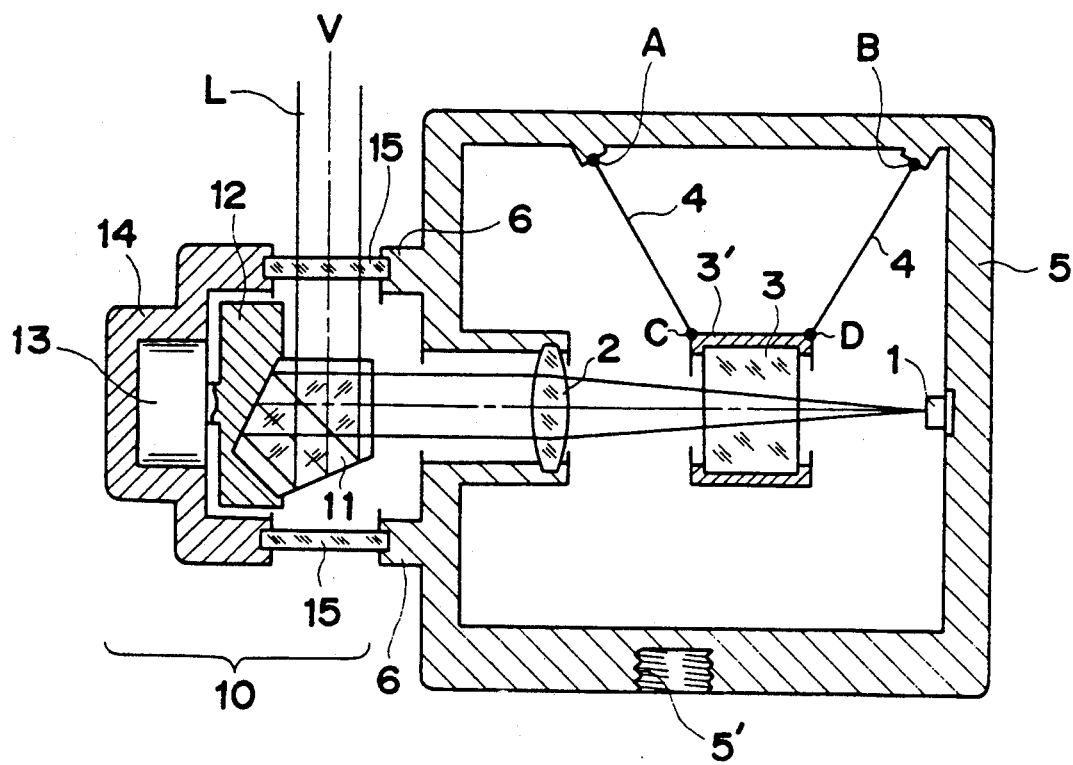
FIG. 6 is an axially sectional view schematically illustrating the apparatus of this invention adapted to project the datum beam in a vertical plane.
Figure 7:
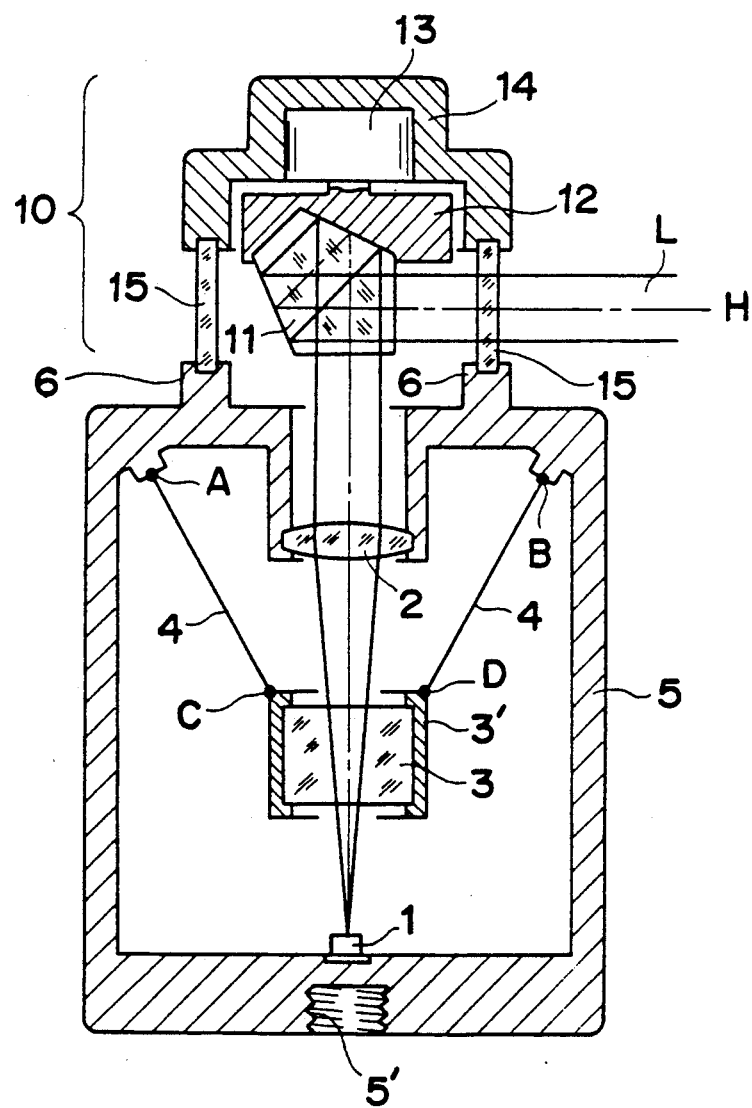
FIG. 7 is a view similar to FIG. 6 but illustrating the apparatus of this invention adapted to project the datum beam in a horizontal plane.

FIGS. 6 and 7 illustrate an embodiment of the apparatus constructed according to this invention comprising a two-face reflector 11 disposed in the optical path of the datum beam L and adapted to be rotated by an electromotor 13. This two-face reflector 11 is provided in the form of a two-face reflector unit 10 detachably mounted on a mounting frame 6 formed integrally with the apparatus 5.

Referring to FIGS. 6 and 7, reference numeral 5' designates a screw by which the apparatus 5 is mounted on a given horizontal trestle. In the apparatus 5 of FIG. 6, as in the arrangement of FIG. 1 adapted to project the datum beam in the horizontal direction, the optical path connecting the light source 1, the projecting lens system 2 and plane-parallel glass 3 in this order horizontally extends while, in the apparatus of FIG. 7, as in the arrangement of FIG. 2 adapted to project the datum beam vertically upward, the optical path connecting the light source 1, the projecting lens system 2 and the plane-parallel glass 3 in this order extends vertically upward. Reference numeral 3' designates a suspension frame for the plane-parallel glass 3. The two-face reflector unit 10 comprises an electromotor supporting frame 14 and cylindrical aperture plates 15 and contains therein the electromotor 13, the two-face reflector 11 and a supporting frame 12 for this refector. Said aperture plates 15 are detably mounted on the mounting frame 6 integral with the apparatus 5. The electromotor supporting frame 14 supports the electromotor 13 and the supporting frame 12 rotatably driven by the electromotor 13 integrally holds the two-face reflector 11 so that the two-face reflector 11 relects the datum beam L coming along the optical path defined by said light source 1, said projecting lens system 2 and the plane-parallel glass 3 in the direction perpendicular to said optical path and projects the beam through the aperture plates 15. Accordingly, the datum beam L reflected by the rotatable two-face reflector 11 is projected in a vertical plane defined by rotation of the vertical datum line V in the apparatus of FIG. 6 while said datum beam L is projected in a horizontal plane defined by rotation of the horizontal datum line H in the apparatus of FIG. 7.

The light source 1 which can be used in the apparatus of this invention is generally classified into two types, i.e., the diffusive ray type comprising a laser diode, light emitting diode etc. as used in the embodiments of FIGS. 1 through 7 for projection of the divergent rays L1, as seen in FIG. 8 ($a$), and the parallel ray type comprising, for example, HeNe laser adapted to project the parallel rays L2 as seen in FIG. 8 ($b$).

When the light source 1 of said parallel ray type is employed, the parallel rays coming from the light source 1 are once condensed by the condensing lens 7 and then projected through the projecting lens system 2 as shown by FIG. 9 or the parallel rays coming from the light source 1 are once diffused by the diffusing lens 8 and then projected through the projecting lens system 2 as shown by FIG. 10. Referring to FIG. 9, reference numeral 01 designates a condensing point of the condensing lens 7. In FIG. 9, the focus of the projecting lens system 2 is arranged to be in coincidence with said condensing point 01 and the plane-parallel glass 3 is located between the condensing point 01 and the projecting lens system 2. Referring to FIG. 10, reference numeral 02 designates a diffusion datum point. In FIG. 10, the focus of the projecting lens system 2 is arranged to be in coincidence with said diffusion datum point 02 and the plane-parallel glass 3 is located between the diffusing lens 8 and the projecting lens system 2.

As will be apparent from the foregoing description, the apparatus of this invention enables a tilt of the datum beam to be effectively compensated merely by tilting the plane-parallel glass by the angle $\beta$ corresponding to a predetermined times the tilt $\alpha$ of the apparatus, so that the complicated arrangement comprising concave lenses, prisms etc. usually required for compensation can be eliminated and thereby not only can the structure be simplified but also the apparatus of a reliable precision can be obtained at a reasonable cost. Another advantage of this invention lies in that the datum beam can be compensated merely by suspension of the plane-parallel glass. Additionally, the direction of the projected datum beam can be set up in the horizontal, vertically upward or vertically downward direction according to the same principle and with the same construction, so the apparatus of this invention can be used, without any modification, with existing surveying equipment of various types intending to project the datum beam in various directions. Moreover, merely by incorporating the rotatable two-face reflector, there can be provided the apparatus adapted to project the datum beam in the horizontal or vertical plane. Finally, the two-face reflector unit rotatably driven by the electromotor may be detachably mounted on the apparatus to provide the appratus adapted to project the datum beam in the horizontal or vertical plane. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A datum beam projecting apparatus for use with surveying equipment to project light rays emitted from a light source as a datum beam through a projecting lens system, comprising a plane-parallel glass to compensate for tilt of the datum beam, to thereby maintain a direction of the projected datum beam constant with respect to tilt of said apparatus and suspension line means for tiltably locating said plane-parallel glass in an optical path defined between the light source and the projecting lens system to satisfy a following equation:

$$\tan \beta = K \tan \alpha$$

where $\alpha$ represents a tilt of the apparatus, $\beta$ represents a tile of the plane-parallel glass and K is a constant.

2. The datum beam projecting apparatus for use with surveying equipment as recited in claim 1, wherein when the plane-parallel glass is suspended such that the tilt $\beta$ corresponds to K times the tilt $\alpha$ of said apparatus, the datum beam is maintained coincident with a datum line.

3. The datum beam projecting apparatus for use with surveying equipment as recited in claim 1 or 2, wherein the plane-parallel glass is located in the optical path defined between the light source and the projecting lens system.

4. The datum beam projecting apparatus for use with surveying equipment as recited in claim 1 or 2, wherein the plane-parallel glass is located in the optical path including the projecting lens system.

5. The datum beam projecting apparatus for use with surveying equipment as recited in claim 1 or 2, wherein the datum beam is projected in a horizontal direction.

6. The datum beam projecting apparatus for use with surveying equipment as recited in claim 1 or 2, wherein the datum beam is projected in a vertically upward direction.

7. The datum beam projecting apparatus as recited in claim 1 or 2, wherein the datum beam is projected in a vertical downward direction.

8. The datum beam projecting apparatus as recited in claim 1 or 2, wherein a rotatable two-face reflector is provided in the optical path of the datum beam.

9. The datum beam projecting apparatus for use with surveying equipment as recited in claim 8, wherein the two-face reflector is rotatably driven by an electromotor and said two-face reflector comprises a two-face reflector unit detachably mounted on the apparatus.

* * * * *